(12) United States Patent
Teeter et al.

(10) Patent No.: US 11,005,568 B1
(45) Date of Patent: May 11, 2021

(54) OPTICAL TRANSCEIVER SYSTEM

(71) Applicant: Dell Products L.P., Round Rock, TX (US)

(72) Inventors: Victor Teeter, Round Rock, TX (US); Shree Rathinasamy, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/929,525

(22) Filed: May 7, 2020

(51) Int. Cl.
  *H04B 10/00* (2013.01)
  *H04B 10/40* (2013.01)
  *H04B 10/077* (2013.01)
  *H04J 14/00* (2006.01)

(52) U.S. Cl.
  CPC ......... *H04B 10/40* (2013.01); *H04B 10/0775* (2013.01); *H04B 2210/078* (2013.01)

(58) Field of Classification Search
  CPC ..... H04B 10/40; H04B 10/43; H04B 2210/08
  See application file for complete search history.

(56) References Cited

U.S. PATENT DOCUMENTS

| 2011/0233037 A1* | 9/2011 | Wilkolaski | H01H 13/803 200/5 A |
| 2015/0041296 A1* | 2/2015 | Bertsch | G06K 7/00 200/329 |
| 2015/0358087 A1* | 12/2015 | Pavlas | H04B 10/508 398/182 |

OTHER PUBLICATIONS

Tim Leffelman, "Normally Open vs Normally Closed", Feb. 2, 2018, https://tim.silvrback.com/normally-open-vs-normally-closed, Retrieved Dec. 4, 2020.*

* cited by examiner

*Primary Examiner* — Daniel G Dobson
(74) *Attorney, Agent, or Firm* — Haynes and Boone, LLP

(57) ABSTRACT

An optical transceiver system includes an optical transceiver chassis including a cable connector, a laser subsystem, and a sensor subsystem. A controller included in the optical transceiver chassis is coupled to the laser subsystem and the sensor subsystem. The controller receives a cable connection signal from the sensor subsystem that indicates that a cable has been connected to the cable connector included on the optical transceiver chassis and, in response, activates the laser subsystem. Subsequent to activating the laser subsystem, the controller receives a cable disconnection signal from the sensor subsystem that indicates that the cable has been disconnected from the cable connector included on the optical transceiver chassis and, in response, deactivates the laser subsystem.

17 Claims, 11 Drawing Sheets

OPTICAL TRANSCEIVER SYSTEM

BACKGROUND

The present disclosure relates generally to information handling systems, and more particularly to optical transceivers used with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems including switch devices and/or other networking devices known in the art sometimes utilize optical transceiver devices such as, for example, Quad Small Form-factor Pluggable (QSFP) optical transceiver devices. Many optical transceiver devices provide a compact, hot-pluggable network interface module for use in data communications, and may be connected to a port on the switch device. A fiber optic cable may then be connected to the optical transceiver device, and electrical data signals received by the optical transceiver device from the switch device may then be converted to optical signals using a laser subsystem in the optical transceiver device, with those optical signals provided by that laser subsystem directed by the optical transceiver device through optical fibers in the fiber optic cable. However, conventional optical transceiver devices activate their laser subsystem by default in response to being connected to the port on the switch device, which can raise some issues. For example, the default laser subsystem activation discussed above utilizes power even when a fiber optic cable is not connected to the optical transceiver device. Furthermore, the laser produced by the laser subsystem can escape the optical transceiver device when a fiber optic cable is not plugged into the optical transceiver device, as the laser subsystem covers (sometimes referred to as "dust covers") that are provided with optical transceivers are often discarded once the optical transceiver device is connected to the port on the switch device, which can present a danger to the eyes of users.

Accordingly, it would be desirable to provide an optical transceiver system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a controller engine that is configured to: receive, from a sensor subsystem included in an optical transceiver device, a cable connection signal that indicates that a cable has been connected to a cable connector included on the optical transceiver device; activate, in response to receiving the cable connection signal, a laser subsystem included in the optical transceiver device; receive, from the sensor subsystem subsequent activating the laser subsystem, a cable disconnection signal that indicates that the cable has been disconnected from the cable connector included on the optical transceiver device; and deactivate, in response to receiving the cable disconnection signal, the laser subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
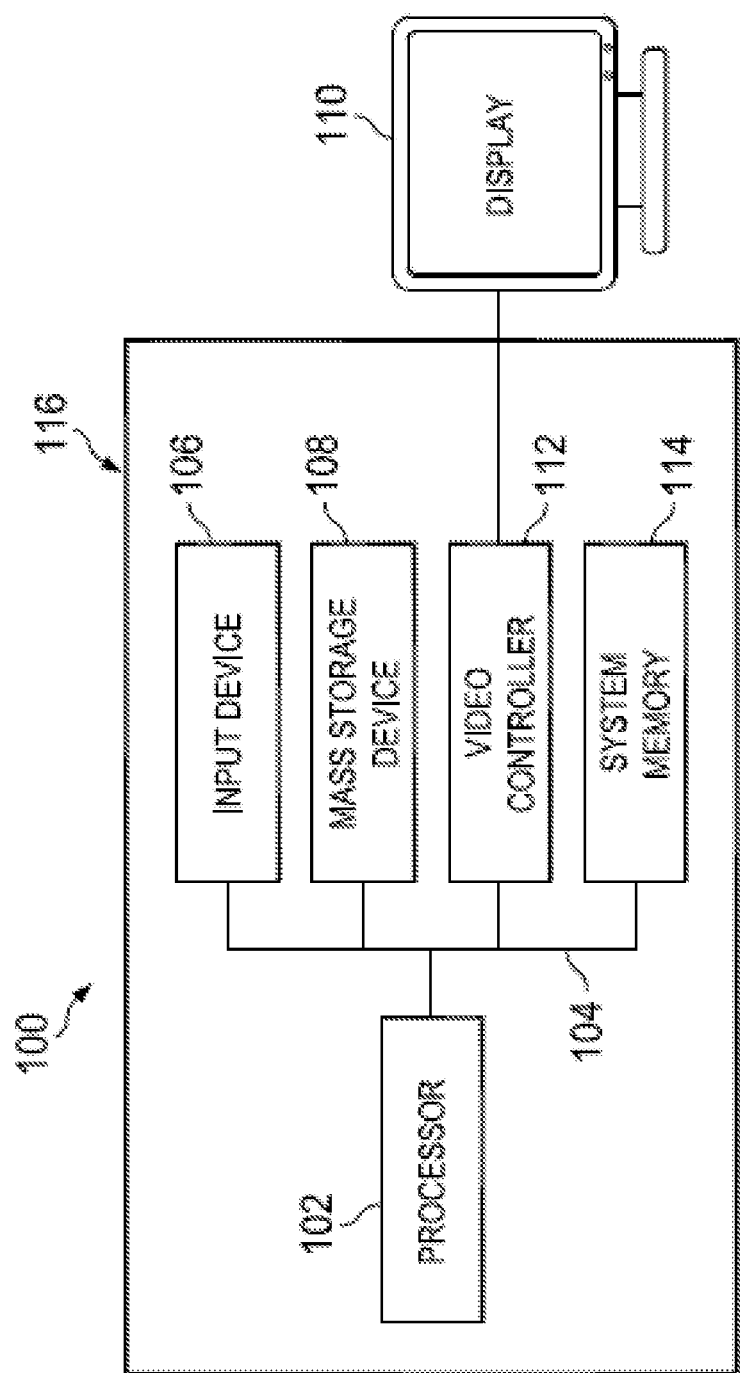
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
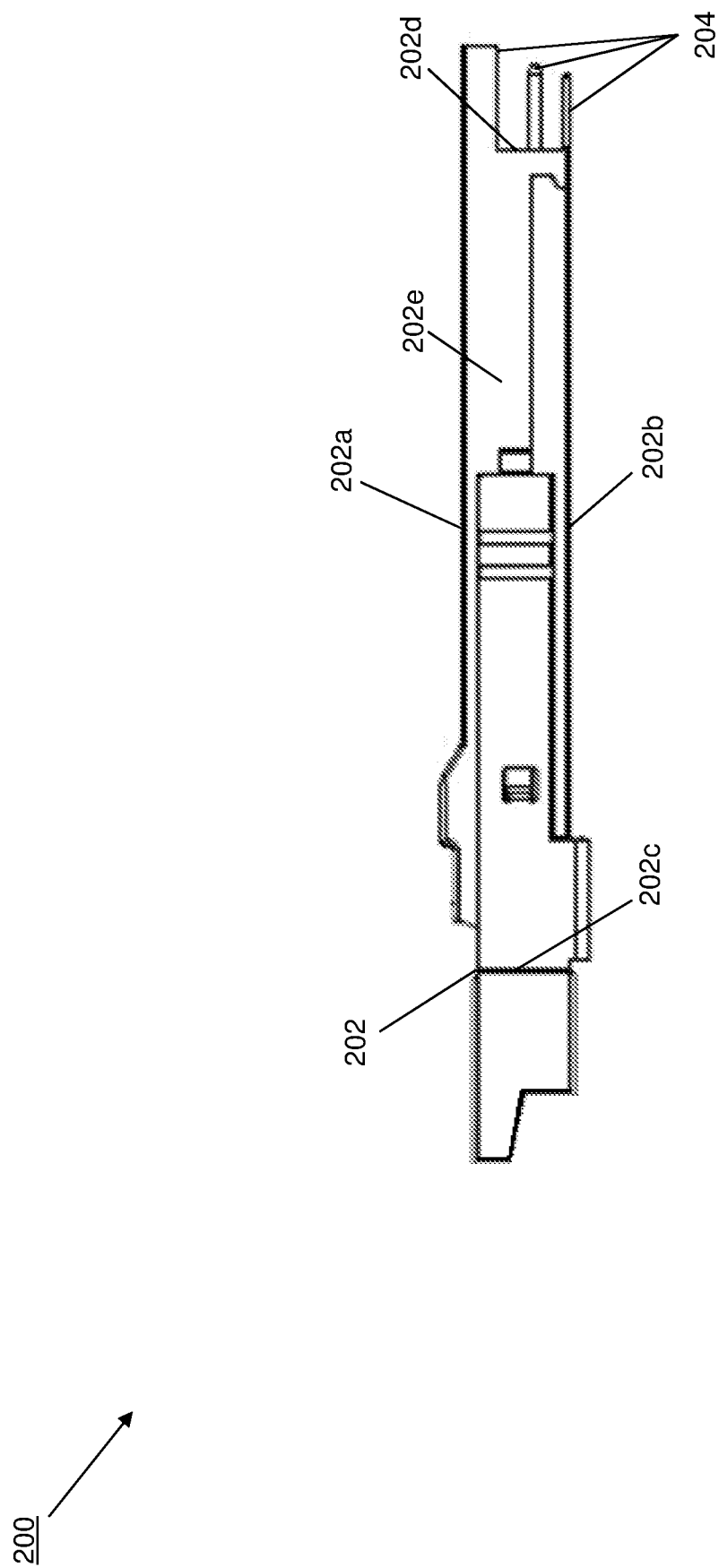
FIG. 2 is a side view illustrating an embodiment of an optical transceiver device.

Referring now to FIG. 2, an embodiment of an optical transceiver device 200 is illustrated that may include the optical transceiver system of the present disclosure. In the illustrated embodiment, the optical transceiver device 200 includes an optical transceiver chassis 202 having a top surface 202a, a bottom surface 202b that is located opposite the optical transceiver chassis 202 from the top surface 202a, a front surface 202c that extends between the top surface 202a and the bottom surface 202b, a bottom surface 202d that is located opposite the optical transceiver chassis 202 from the front surface 202c and that extends between the top surface 202a and the bottom surface 202b, and a pair of opposing side surfaces (with the side surface 202e illustrated in FIG. 2) that are located opposite the optical transceiver chassis 202 from each other and that extend between the top surface 202a, the bottom surface 202b, the front surface 202c, and the rear surface 202d. In the illustrated embodiment, the optical transceiver device 200 also includes a computing device connector 204 that extends from the rear surface 202d.

As discussed in further detail below, the optical transceiver device 200 may be configured to connect (e.g., via the computing device connector 204) to a port on the IHS 100 discussed above with reference to FIG. 1, as well as to other computing devices such as switch devices or other networking devices known in the art, in order to provide for the conversion of electrical data signals to optical data signals, and the transmission of those optical data signals. As such, while not illustrated and/or described with element numbers in FIG. 2, one of skill in the art in possession of the present disclosure will appreciate that the optical transceiver device 200 and/or optical transceiver chassis 202 may include any of a variety of optical transceiver components (e.g., computing device coupling features, heat sinks, etc.) that would be apparent to one of skill in the art in possession of the present disclosure in addition to those explicitly described below. Furthermore, while one of skill in the art in possession of the present disclosure will recognize that the optical transceiver device 200 is illustrated and described as a Small Form-factor Pluggable (SFP) optical transceiver device (e.g., a Quad SFP+(QSFP+) optical transceiver device), one of skill in the art in possession of the present disclosure will appreciate that other optical transceiver devices will benefit from the teachings of the present disclosure and thus will fall within its scope as well.

Figure 3A:
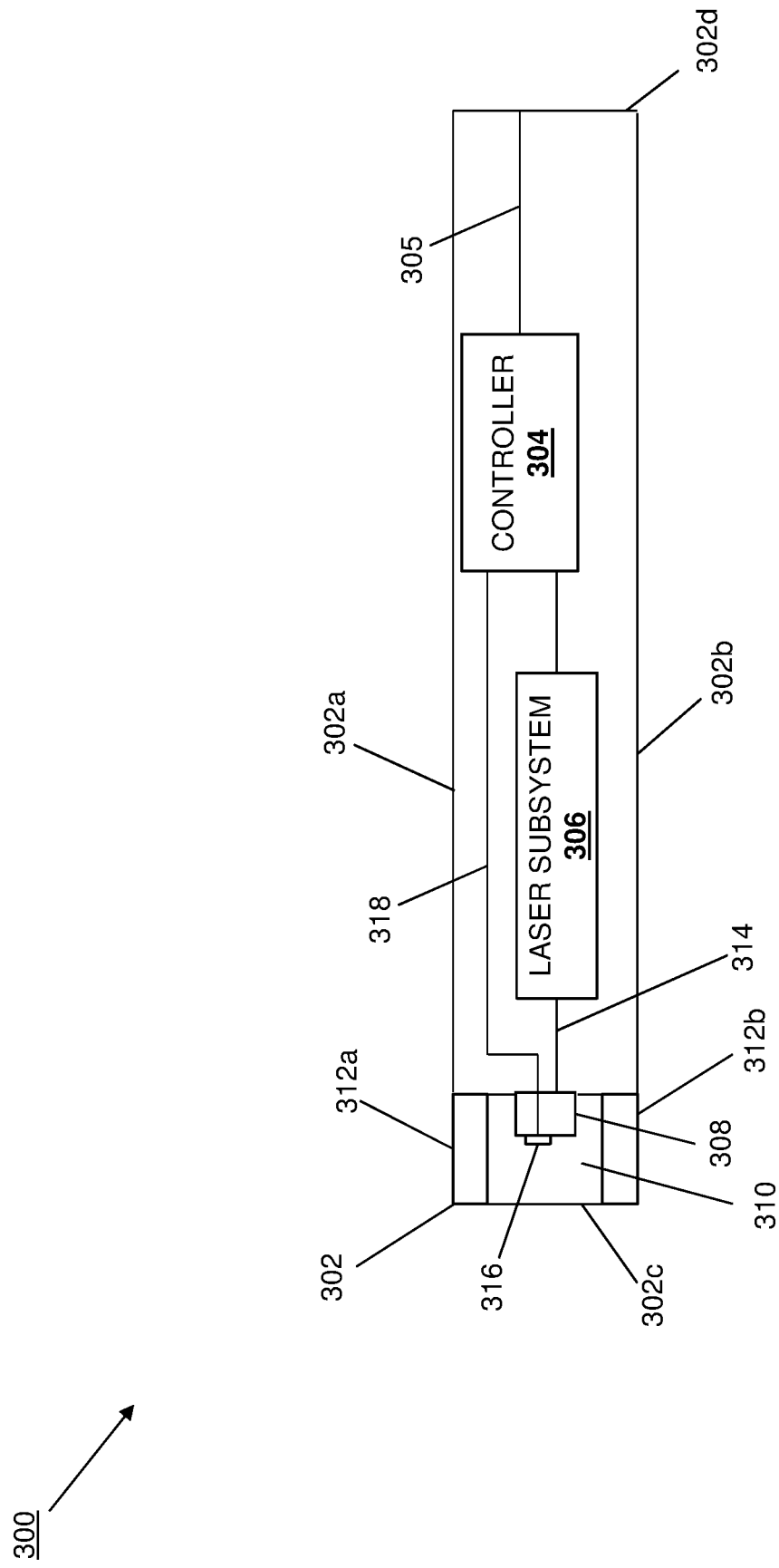
FIG. 3A is a schematic view illustrating an embodiment of the optical transceiver device of FIG. 2.
Figure 3B:
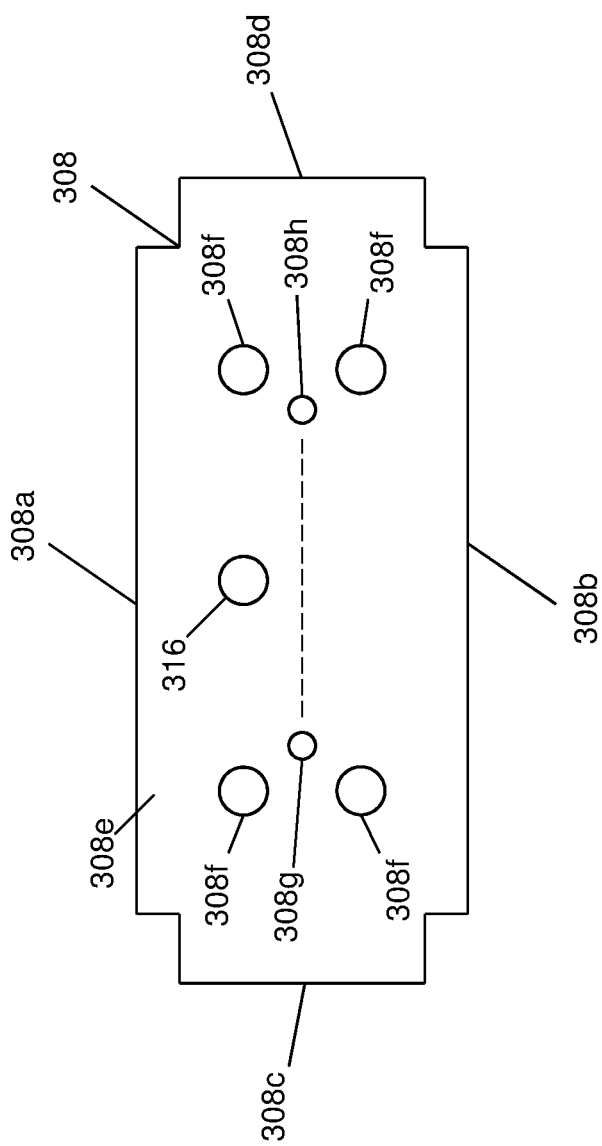
FIG. 3B is a schematic view illustrating an embodiment of an cable connector on optical transceiver device of FIG. 3A.

Referring now to FIGS. 3A and 3B, an embodiment of an optical transceiver device 300 is illustrated that may provide the optical transceiver device 200 discussed above with reference to FIG. 2, and one of skill in the art in possession of the present disclosure will recognize that the embodiment of the optical transceiver device 300 illustrated in FIG. 3A includes an optical transceiver chassis that is similar to the optical transceiver chassis 202 discussed above with reference to FIG. 2, while omitting a computing device connector (similar to the computing device connector 204 discussed above with reference to FIG. 2) for clarity of illustration and discussion. As such, the optical transceiver device 300 may include an optical transceiver chassis 300 having a top surface 302a, a bottom surface 302b that is located opposite the optical transceiver chassis 302 from the top surface 302a, a front surface 302c that extends between the top surface 302a and the bottom surface 302b, a rear surface 302d that is located opposite the optical transceiver chassis 302 from the front surface 302c and that extends between the top surface 302a and the bottom surface 302b, and a pair of opposing side surfaces (not illustrated in FIG. 3) that are located opposite the optical transceiver chassis 302 from each other and that extend between the top surface 302a, the bottom surface 302b, the front surface 302c, and the rear surface 302d. Thus, one of skill in the art in possession of the present disclosure will appreciate that the optical transceiver chassis 300 and its top surface 302a, bottom surface 302b, front surface 302c, and rear surface 302d (as well as its unillustrated side surfaces) may correspond to the optical transceiver chassis 200 and its respective top surface 202a, bottom surface 202b, front surface 202c, and rear surface 202d (as well as its side surface 202e and unillustrated side surface.)

In the illustrated embodiment, the optical transceiver chassis 302 houses a controller 304 that may be provided by, for example, a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a controller engine that is configured to perform the functionality of the controller engines and controller 304 discussed below. As illustrated, the controller 304 may include a coupling 305 that may couple to a computing device connector (e.g., similar to the computing device connector 204 discussed above with reference to FIG. 2) that extends from the rear surface 302d of the optical transceiver device 300. In the illustrated embodiment, the optical transceiver chassis 300 also houses a laser subsystem 306 that is coupled to the controller 304 (e.g., via a coupling between the laser subsystem 306 and the processing system that provides the controller 304) and that may include any laser subsystem components that are configured to emit a laser as discussed below. Furthermore, while not illustrated in FIG. 3A, one of skill in the art in possession of the present disclosure will recognize that the optical transceiver chassis 302 may house a variety of other laser subsystem components and controller components for providing the laser subsystem functionality discussed below while remaining within the scope of the present disclosure as well.

In the illustrated embodiment, the optical transceiver chassis 302 also includes a cable connector 308 that is located in a cable connector housing 310 that is defined between the front surface 302c of the optical transceiver chassis 302, an optical transceiver chassis wall 312a that provides a portion of the top surface 302a of the optical transceiver chassis 302, and an optical transceiver chassis wall 312b that provides a portion of the bottom surface 302b of the optical transceiver chassis 302. FIG. 3B illustrates an embodiment of the cable connector 308 that includes a top edge 308a, a bottom edge 308b that is located opposite the cable connector 308 from the top edge 308a, a pair of side edges 308c and 308d that are located opposite the cable connector 308 from each other and that extend between the top edge 308a and the bottom edge 308b, and a front surface 308 that extends between the top edge 308a, the bottom edge 308b, and the side edges 308c and 308d. The cable connector 308 illustrated in FIG. 3B includes a plurality of alignment elements 308f that are included on the front surface 308e of the cable connector 308, an optical data signal transmission element 308g that is included on the front surface 308e of the cable connector 308, and an optical data signal receiving element 308h that is included on the front surface 308e of the cable connector 308. As will be appreciated by one of skill in the art in possession of the present disclosure, the alignment elements 308f may be configured to engage a transceiver connector on a cable in order to align fiber optical cabling in the cable and accessible on the transceiver connector with the optical data signal transmission element 308g and the optical data signal receiving element 308h. Furthermore, while not explicitly illustrated in FIGS. 3A and 3B, one of skill in the art in possession of the present disclosure will appreciate that the cable connector 308 may include a variety of other features (e.g., transceiver connector securing features, etc.) while remaining within the scope of the present disclosure as well.

In the illustrated embodiment, the laser subsystem 306 is connected to the cable connector 308 via a coupling 314. For example, the coupling 314 may be provided by optical fibers and/or other coupling materials that are configured to transmit a laser emitted by the laser subsystem 306 to the cable connector 308 (e.g., to the optical data signal transmission element 308g on the cable connector 308.) While not illustrated or discussed below, one of skill in the art in possession of the present disclosure will recognize that the optical data signal receiving element 308h on the cable connector 308 may be coupled to the controller 304 to provide received optical signals to the controller 304 as well.

A sensor subsystem is included in optical transceiver chassis 302 and, in the illustrated embodiment, is provided by a force sensor element 316 that is included on the front surface 308e of the cable connector 308. In the illustrated embodiment, the force sensor element 316 is coupled to the controller 304 by a coupling 318, and as discussed below may be configured to provide a connection signal via the coupling 318 to the controller 304 in response to experiencing a force that is provided during the connection of a transceiver connector and the cable connector 308. As such, the force sensor element 316 may include a button that is configured to move into the cable connector 308 (e.g., that extends from the front surface 308e of the cable connector 308 and moved relative to that front surface 308e), a pressure sensor, and/or any other sensor element that operates in response to a force as described herein while remaining within the scope of the present disclosure as well. However, while a specific optical transceiver device 300 has been illustrated and described, one of skill in the art in possession of the present disclosure will recognize that the optical transceiver device of the present disclosure may include a variety of components and component configurations while remaining within the scope of the present disclosure as well.

Figure 4A:
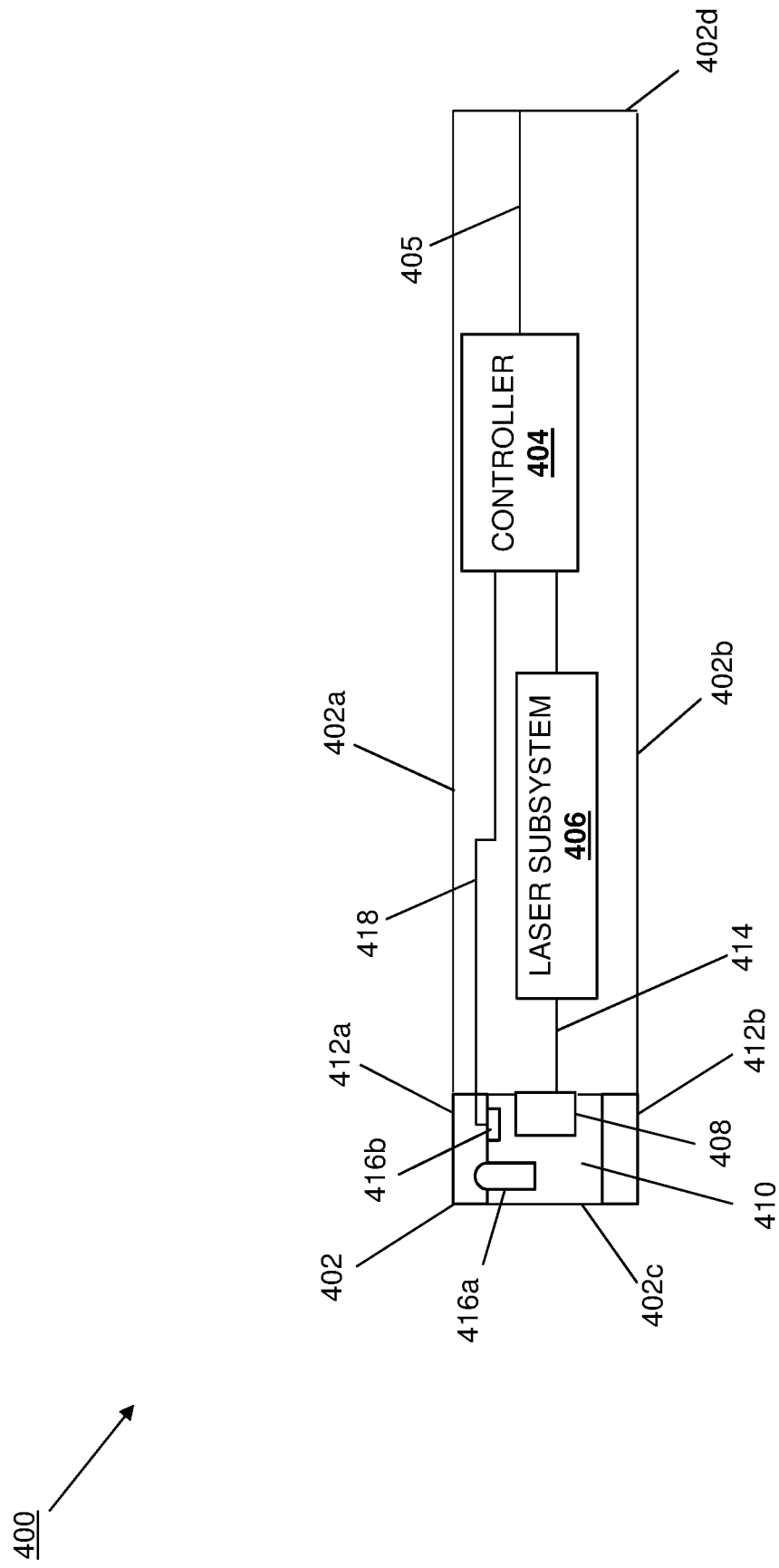
FIG. 4A is a schematic view illustrating an embodiment of the optical transceiver device of FIG. 2.
Figure 4B:
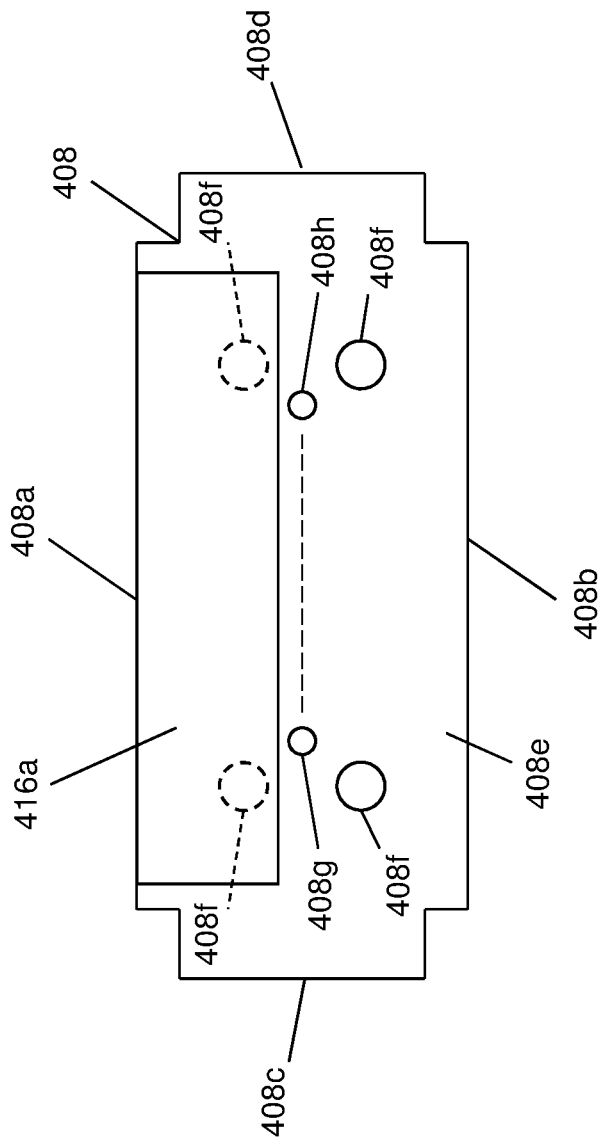
FIG. 4B is a schematic view illustrating an embodiment of an cable connector on optical transceiver device of FIG. 4A

Referring now to FIGS. 4A and 4B, another embodiment of an optical transceiver device 400 is illustrated that may provide the optical transceiver device 200 discussed above with reference to FIG. 2, and one of skill in the art in possession of the present disclosure will recognize that the embodiment of the optical transceiver device 400 illustrated in FIG. 4A includes an optical transceiver chassis that is similar to the optical transceiver chassis 202 discussed above with reference to FIG. 2, while omitting a computing device connector (similar to the computing device connector 204 discussed above with reference to FIG. 2) for clarity of illustration and discussion. As such, the optical transceiver device 400 may include an optical transceiver chassis 400 having a top surface 402a, a bottom surface 402b that is located opposite the optical transceiver chassis 402 from the top surface 402a, a front surface 402c that extends between the top surface 402a and the bottom surface 402b, a rear surface 402d that is located opposite the optical transceiver chassis 402 from the front surface 402c and that extends between the top surface 402a and the bottom surface 402b, and a pair of opposing side surfaces (not illustrated in FIG. 4) that are located opposite the optical transceiver chassis 402 from each other and that extend between the top surface 402a, the bottom surface 402b, the front surface 402c, and the rear surface 402d. As such, one of skill in the art in possession of the present disclosure will appreciate that the optical transceiver chassis 400 and its top surface 402a, bottom surface 402b, front surface 402c, and rear surface 402d (as well as its unillustrated side surfaces) may correspond to the optical transceiver chassis 200 and its respective top surface 202a, bottom surface 202b, front surface 202c, and rear surface 202d (as well as its side surface 202e and unillustrated side surface.)

In the illustrated embodiment, the optical transceiver chassis 402 houses a controller 404 that may be provided by, for example, a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a controller engine that is configured to perform the functionality of the controller engines and controller 404 discussed below. As illustrated, the controller 404 may include a coupling 405 that may couple to a computing device connector (e.g., similar to the computing device connector 204 discussed above with reference to FIG. 2) that extends from the rear surface 402d of the optical transceiver device 400. In the illustrated embodiment, the optical transceiver chassis 400 also houses a laser subsystem 406 that is coupled to the controller 404 (e.g., via a coupling between the laser subsystem 406 and the processing system that provides the controller 404) and that may include any laser subsystem components that are configured to emit a laser as discussed below. Furthermore, while not illustrated in FIG. 4A, one of skill in the art in possession of the present disclosure will recognize that the optical transceiver chassis 402 may house a variety of other laser subsystem components and controller components for providing the laser subsystem functionality discussed below while remaining within the scope of the present disclosure as well.

In the illustrated embodiment, the optical transceiver chassis 402 also includes a cable connector 408 that is located in a cable connector housing 410 that is defined between the front surface 402c of the optical transceiver chassis 402, an optical transceiver chassis wall 412a that provides a portion of the top surface 402a of the optical transceiver chassis 402, and an optical transceiver chassis wall 412b that provides a portion of the bottom surface 402b of the optical transceiver chassis 402. FIG. 4B illustrates an embodiment of the cable connector 408 that includes a top edge 408a, a bottom edge 408b that is located opposite the cable connector 408 from the top edge 408a, a pair of side edges 408c and 408d that are located opposite the cable connector 408 from each other and that extend between the top edge 408a and the bottom edge 408b, and a front surface 408 that extends between the top edge 408a, the bottom edge 408b, and the side edges 408c and 408d. The cable connector 408 illustrated in FIG. 4B includes a plurality of alignment elements 408f that are included on the front surface 408e of the cable connector 408, an optical data signal transmission element 408g that is included on the front surface 408e of the cable connector 408, and an optical data signal receiving element 408h that is included on the front surface 408e of the cable connector 408. As will be appreciated by one of skill in the art in possession of the present disclosure, the alignment elements 408f may be configured to engage a transceiver connector on a cable in order to align fiber optical cabling in the cable and accessible on the transceiver connector with the optical data signal transmission element 408g and the optical data signal receiving element 408h. Furthermore, while not explicitly illustrated in FIGS. 4A and 4B, one of skill in the art in possession of the present disclosure will appreciate that the cable connector 408 may include a variety of other features (e.g., transceiver connector securing features, etc.) while remaining within the scope of the present disclosure as well.

In the illustrated embodiment, the laser subsystem 406 is connected to the cable connector 408 via a coupling 414. For example, the cable coupling 414 may be provided by optical fibers and/or other coupling materials that are configured to transmit a laser emitted by the laser subsystem 406 to the cable connector 408 (e.g., to the optical data signal transmission element 408g on the cable connector 408.) While not illustrated or discussed below, one of skill in the art in possession of the present disclosure will recognize that the optical data signal receiving element 408h on the cable connector 408 may be coupled to the controller 404 to provide received optical signals to the controller 404 as well.

A sensor subsystem is included in optical transceiver chassis 402 and, in the illustrated embodiment, is provided by a first switch sensor element 416a that is movably coupled to the wall 412a and that extends into the cable connector housing 410, along with a second switch sensor element 416b that is provided on the wall 412a in a spaced apart orientation from the first switch sensor element 416a. As illustrated in FIG. 4B, the first switch sensor element 416a may extend from the wall 412a and in front of a portion of the cable connector 408 (e.g., such that two of the alignment elements 408f adjacent the top edge 408a of the cable connector 408 are obscured from the point of view illustrated in FIG. 4B.) In one example, the first switch sensor element 416a may extend from the wall 412a and in front of the portion of the cable connector 408 as illustrated in FIG. 4B in response to a gravity force that is exerted on the first switch sensor element 416a when the optical transceiver device 400 is in an appropriate orientation. In another example, the first switch sensor element 416a may extend from the wall 412a and in front of the portion of the cable connector 408 as illustrated in FIG. 4B in response to a spring force that is exerted on the first switch sensor element 416a by a spring or other resilient member that extends between the wall 412a and the first switch sensor element 416a (not illustrated.) However, while a few examples are illustrated and/or described, one of skill in the art in possession of the present disclosure will recognize that the sensor subsystem of FIGS. 4A and 4B may be provided in a variety of manners that will fall within the scope of the present disclosure as well.

In the illustrated embodiment, the second switch sensor element 416b is coupled to the controller 404 by a coupling 418, and as discussed below may be configured to provide a connection signal via the coupling 418 to the controller 304 in response to its engagement with the first switch sensor element 416a. For example, the first switch sensor element 416a may be pivotally coupled to the wall 412a and configured, in response to engagement with a transceiver connector, to pivot about its coupling to the wall 412a and into engagement with the second switch sensor element 416b to close a circuit (not illustrated) that causes the connection signal to be provided to the controller 404 via the coupling 418. As such, the first switch sensor element 416a and second switch sensor element 416b may include any switch components that are configured to close a circuit to provide the connection signal as described herein while remaining within the scope of the present disclosure as well. However, while a specific optical transceiver device 400 has been illustrated and described, one of skill in the art in possession of the present disclosure will recognize that the optical transceiver device of the present disclosure may include a variety of components and component configurations while remaining within the scope of the present disclosure as well.

While two specific examples of sensors subsystems are illustrated and described herein that provide for the automatic activation and de-activation of a laser subsystem in an optical transceiver device in response to the connection of a cable to that optical transceiver device, one of skill in the art in possession of the present disclosure will appreciate that other sensor subsystems may be provided according to the teachings of the present disclosure while remaining within its scope. For example, optical sensor subsystems that can detect the presence of a transceiver connector in the cable connector housing 310/410 (e.g., via the transceiver connector interrupting a light beam, via optical recognition technologies, etc.), magnetic sensor subsystem (e.g., Hall effect sensors) that can detect a magnet in the transceiver connector when it is positioned in the cable connector housing 310/410, and/or any other sensors subsystems that would be apparent to one of skill in the art in possession of the present disclosure may be provided in the optical transceiver system of the present disclosure to activate the laser subsystem in the optical transceiver device as discussed below while remaining within the scope of the present disclosure as well.

Figure 5:
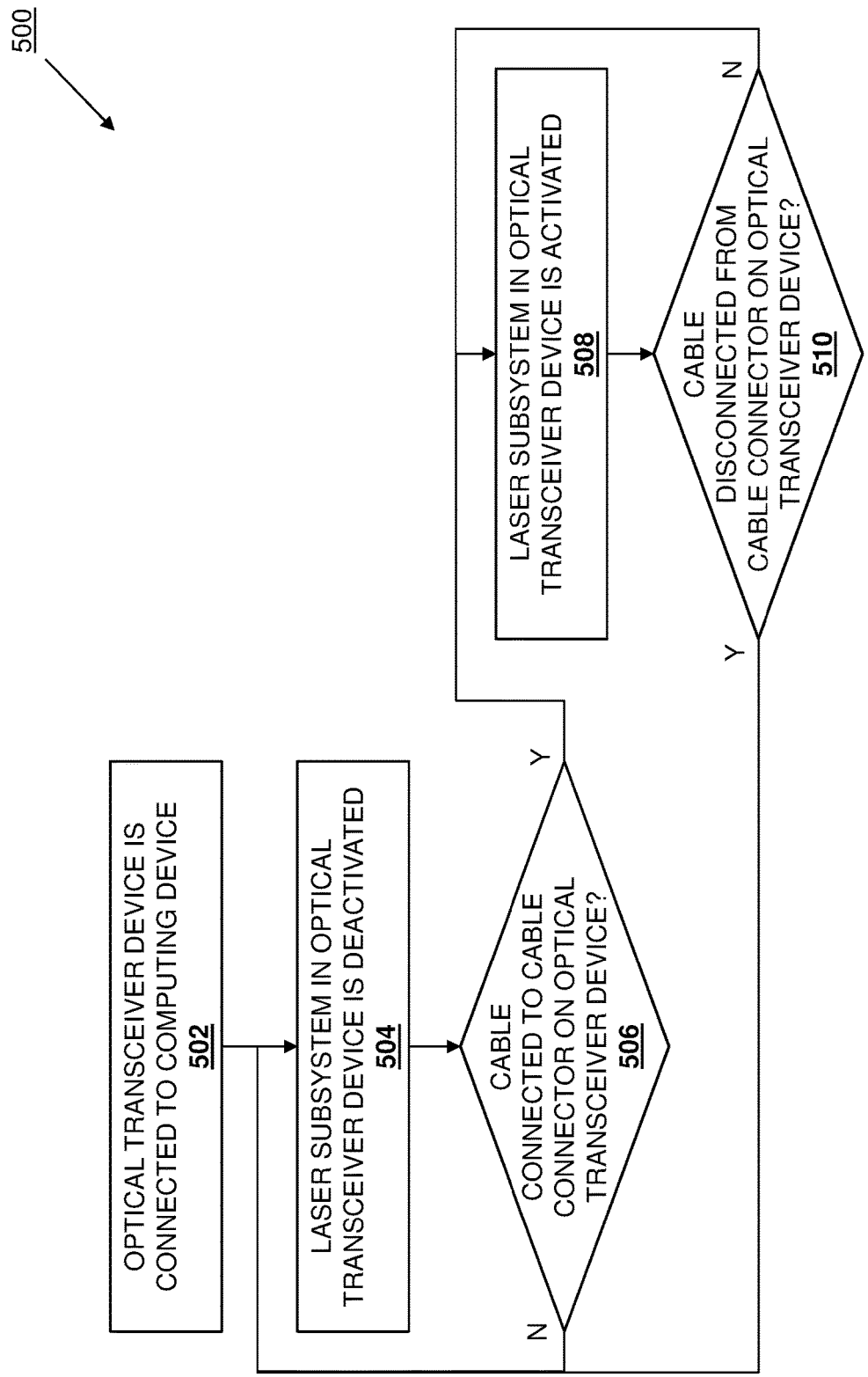
FIG. 5 is a flow chart illustrating an embodiment of a method for operating an optical transceiver device.

Referring now to FIG. 5, an embodiment of a method 500 for operating an optical transceiver device is illustrated. As discussed below, the systems and methods of the present disclosure provide a sensor subsystem in an optical transceiver device that detects when a cable is connected to the cable connector on the optical transceiver device, and a controller in the optical transceiver device may wait for the detection of that cable connection before it activates the laser subsystem in the optical transceiver device, and then deactivate that laser subsystem when the cable is detected as having been disconnected from the cable connector on the optical transceiver device. For example, the sensor subsystem may include a force sensor element that signals the activation of the laser subsystem when a force is provided on the sensor subsystem in response to the connection of the cable and the cable connector, a first switch sensor element that moves in response to the connection of a cable to the cable connector to engage a second switch sensor element and close a circuit in order to signal the activation of the laser subsystem, and/or other sensor subsystems that would be apparent to one of skill in the art in possession of the present disclosure. As such, the laser subsystem in the optical transceiver device remains deactivated until a cable is connected the cable connector on the optical transceiver device, thus saving power that would otherwise be used to activate the laser subsystem by default (i.e., whenever the optical transceiver device is connected to a port on a computing device), and eliminates the possibility of a laser produced by the laser subsystem escaping the optical transceiver device and presenting a danger to the eyes of users.

Figure 6A:
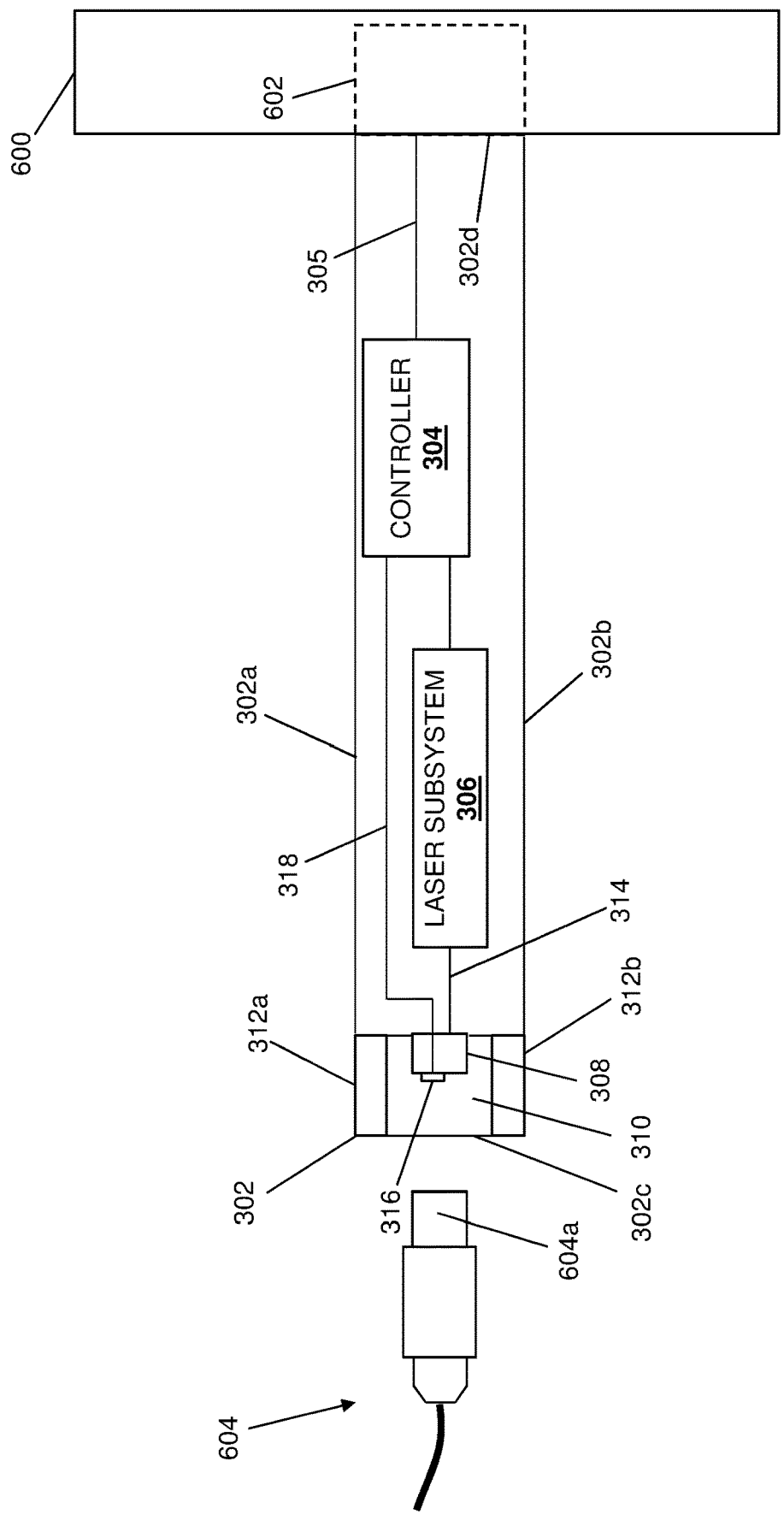
FIG. 6A is a schematic view illustrating an embodiment of the optical transceiver device of FIGS. 3A and 3B operating during the method of FIG. 5.

The method 500 begins at block 502 where an optical transceiver device is connected to a computing device. With reference to FIG. 6A, a computing device 600 such as, for example, a switch device or other networking device known in the art, may be provided that includes an optical transceiver device port 602. As such, in an embodiment of block 502, the optical transceiver device 300 may be positioned adjacent the port 602 on the computing device 600 such that the rear surface 302d (and a computing device connector similar to the computing device connector 204 on the optical transceiver device 200) is located adjacent the optical transceiver device port 602. The optical transceiver device 300 may then be moved towards the optical transceiver device port 602 such that the computing device connector on the optical transceiver device 300 engages the optical transceiver device port 602 to connect and secure the optical transceiver device 300 in the optical transceiver device port 602 on the computing device 600, as illustrated in FIG. 6A.

Figure 7A:
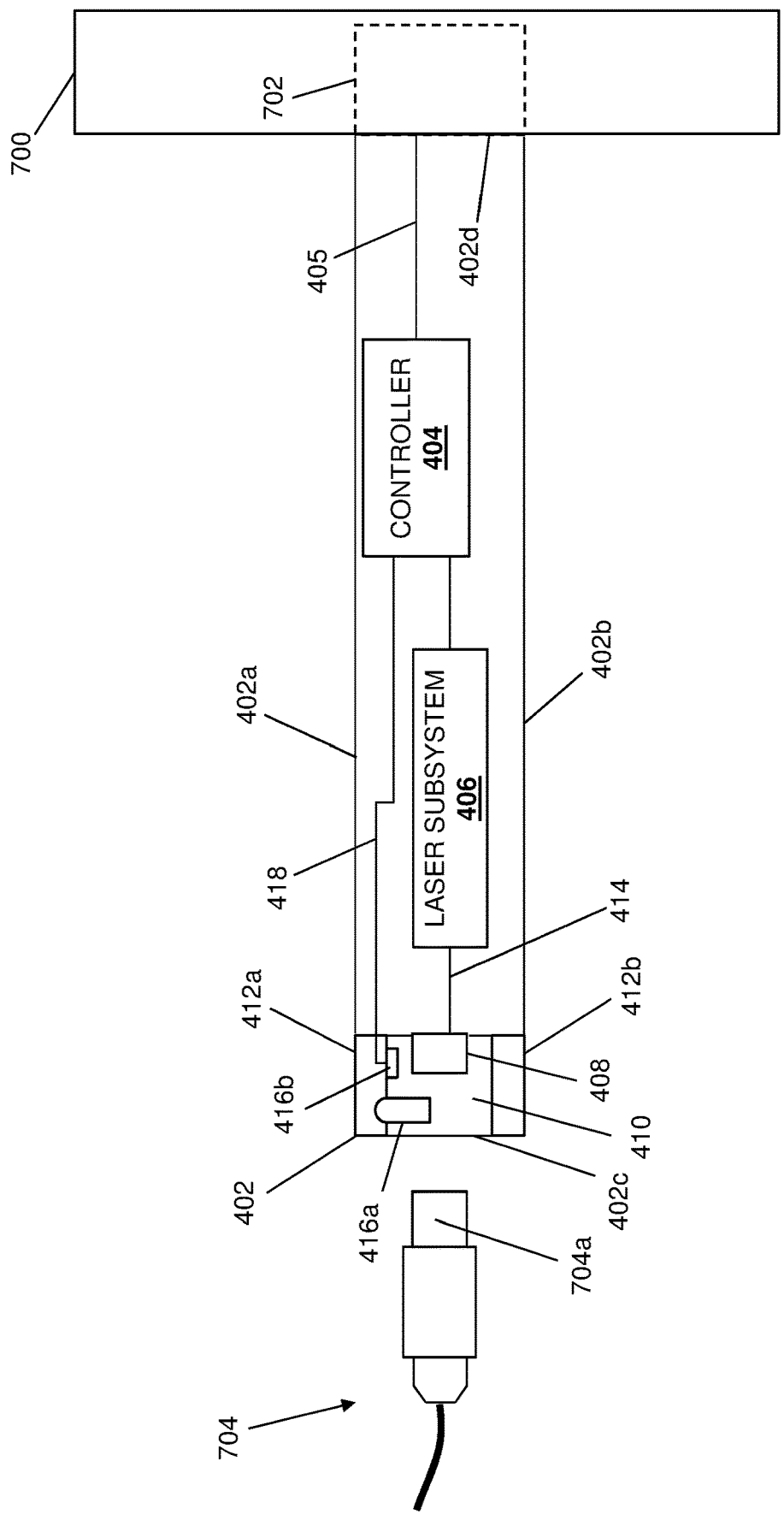
FIG. 7A is a schematic view illustrating an embodiment of the optical transceiver device of FIGS. 4A and 4B operating during the method of FIG. 5.

Similarly, with reference to FIG. 7A, a computing device 700 such as, for example, a switch device or other networking device known in the art, may be provided that includes an optical transceiver device port 702. As such, in an embodiment of block 502, the optical transceiver device 400 may be positioned adjacent the port 702 on the computing device 700 such that the rear surface 402d (and a computing device connector similar to the computing device connector 204 on the optical transceiver device 200) is located adjacent the optical transceiver device port 702. The optical transceiver device 400 may then be moved towards the optical transceiver device port 702 such that the computing device connector on the optical transceiver device 400 engages the optical transceiver device port 702 to connect and secure the optical transceiver device 400 in the optical transceiver device port 702 on the computing device 700, as illustrated in FIG. 7A.

The method 500 then proceeds to block 504 where a laser subsystem in the optical transceiver device is deactivated. In an embodiment, at block 504, the laser subsystem 306/406 in the optical transceiver device 300/400 may be deactivated. As would be understood by one of skill in the art in possession of the present disclosure, conventional optical transceiver devices operate to activate their laser subsystems in response to the connecting of those optical transceiver devices to a port on a computing device. As such, connection of a conventional optical transceiver device to a port on a computing device in similar manner as described above for the optical transceiver devices 300 and 400 would conventionally activate the laser subsystem in that conventional optical transceiver device and cause a laser to be emitted from that laser subsystem, which as discussed above wastes power used to emit the laser, particularly when no cable is connected to the optical transceiver device. Furthermore, the laser emitted by the laser subsystem will be transmitted by the coupling connected to the laser subsystem and out of the optical data signal transmission element on the cable connector on the optical transceiver device, and in situations where no cable in connected to that cable connector, that laser will be emitted into the area adjacent the optical transceiver device and presents a danger to the eyes of users that may enter that area.

As such, in some embodiments of block 504, the laser subsystem 306/406 in the optical transceiver device 300/400 may be deactivated by the controller 304/404 by default such that, when the optical transceiver device 300/400 is connected to the port 602/702 on the computing device 600/700, the laser subsystem 306/406 is not activated. However, in other embodiments of block 504, the laser subsystem 306/406 in the optical transceiver device 300/400 may be activated by default when the optical transceiver device 300/400 is connected to the port 602/702 on the computing device 600/700, and the controller 304/404 may operate to override that default operation and deactivate the laser subsystem 306/406 upon connection of the optical transceiver device 300/400 to the port 602/702 on the computing device 600/700. However, while a few examples of the deactivation of the laser subsystem in the optical transceiver device have been described, one of skill in the art in possession of the present disclosure will recognize that the laser subsystem in the optical transceiver device may be deactivated in a variety of manners that will fall within the scope of the present disclosure as well.

The method 500 then proceeds to decision block 506 where it is determined whether a cable is connected to a cable connector on the optical transceiver device. In an embodiment, at decision block 506, the controller 304/404 in the optical transceiver device 300/400 may operate to monitor for a signal from the sensor subsystem in the optical transceiver device 300/400 in order to determine whether a cable has been connected to the cable connector 308/408 on the optical transceiver device 300/400. For example, with reference to the optical transceiver device 300, the controller 304 may operate to monitor for a signal from the force sensor element 316 in order to determine whether a cable has activated the force sensor element 316 while being connected to the cable connector 308 in order to generate that signal. Similarly, with reference to the optical transceiver device 400, the controller 404 may operate to monitor for a signal from the second switch sensor element 416b in order to determine whether a cable has caused the first switch sensor element 416a to engage the second switch sensor element 416b while being connected to the cable connector 408 in order to close a circuit and generate that signal.

If, at decision block 506, it is determined that a cable is not connected to the cable connector on the optical transceiver device, the method 500 returns to block 504. As such, the method 500 may loop such that the controller 304/404 in the optical transceiver device 300/400 monitors for a signal from the sensor subsystem in the optical transceiver device 300/400 in order to determine whether a cable has been connected to the cable connector 308/408 on the optical transceiver device 300/400. As such, the laser subsystem 306/406 will remain deactivated as discussed above with reference to block 504 as long as a cable is not connected to the cable connector 308/408 on the optical transceiver device 300/400, thus preventing the use of power to activate that laser subsystem 306/406, and eliminating the emission of the laser that would otherwise be emitted from conventional optical transceiver devices and into the area adjacent those conventional optical transceiver devices when they are connected to the port 602/702 and no cable is connected to those conventional optical transceiver devices, as discussed above.

Figure 6B:
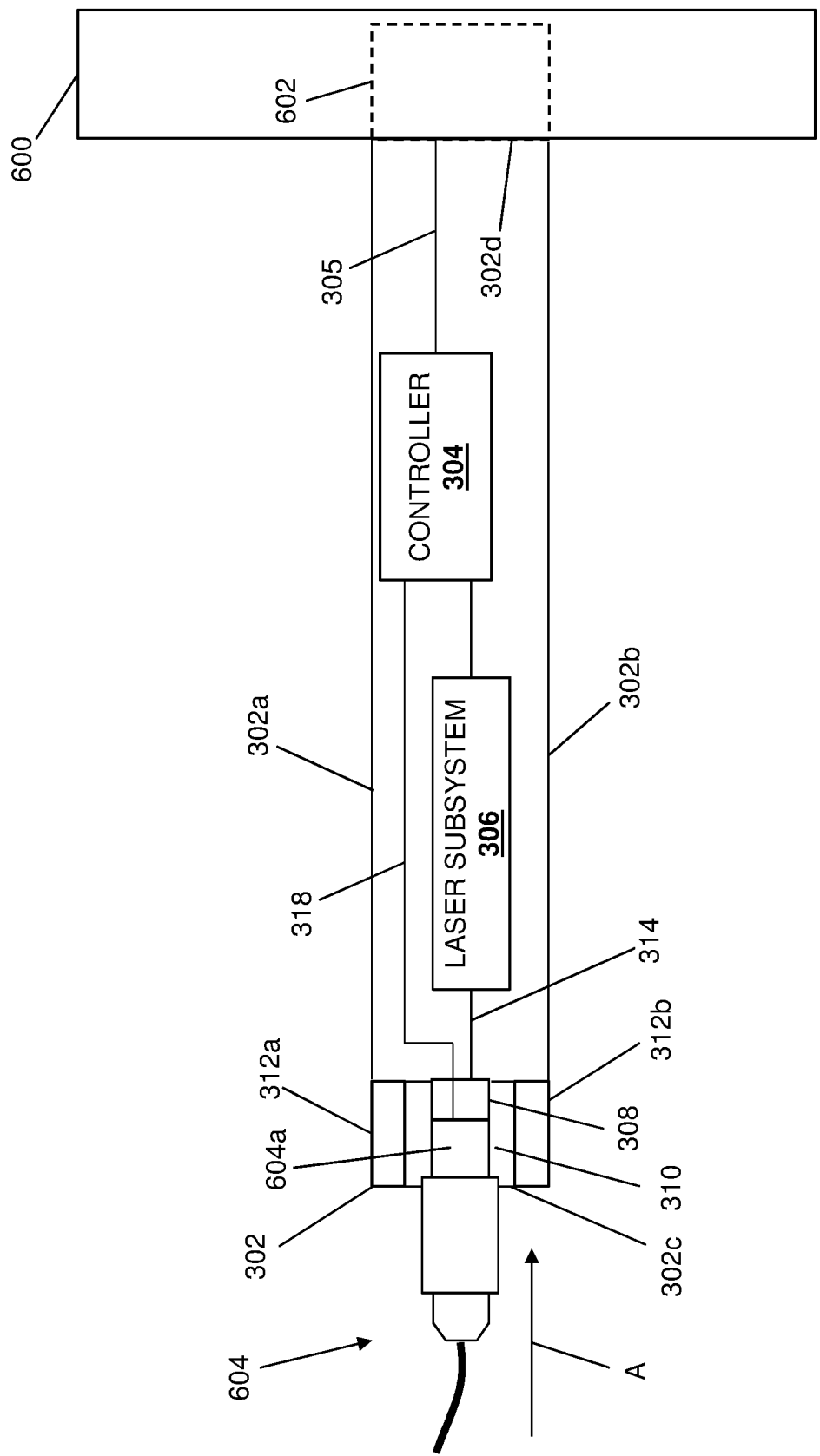
FIG. 6B is a schematic view illustrating an embodiment of the optical transceiver device of FIGS. 3A and 3B operating during the method of FIG. 5.

If at decision block 506, it is determined that a cable is connected to the cable connector on the optical transceiver device, the method 500 proceeds to block 508 where the laser subsystem in the optical transceiver device is activated. In an embodiment, at block 508 and in response to detecting a signal from the sensor subsystem in the optical transceiver device 300/400, the controller 304/404 in the optical transceiver device 300/400 may activate the laser subsystem 306/406. For example, with reference to FIG. 6A, a cable 604 including a transceiver connector 604a may be positioned adjacent the optical transceiver device 300 such that the transceiver connector 604a is located adjacent the front surface 302c of the optical transceiver chassis 302 and aligned with the cable connector 308 on the optical transceiver device 300. As illustrated in FIG. 6B, the transceiver connector 604a may then be moved in a direction A such that the transceiver connector 604a engages the cable connector 308.

As will be appreciated by one of skill in the art in possession of the present disclosure, the engagement of the transceiver connector 604a with the cable connector 308 may begin with the engagement of features on the transceiver connector 604a (not illustrated) with the alignment elements 308f on the cable connector 308 as the transceiver connector 604a is moved in the direction A, which as discussed above operates to align fiber optic cabling that is accessible on the transceiver connector 604a and included in the cable 604 with the optical data signal transmission element 308g and the optical data signal receiving element 308h on the cable connector 308. Continued movement of the transceiver connector 604a in the direction A will then cause the transceiver connector 604a to engage the force sensor element 316 and provide a force on the force sensor element 316 as the transceiver connector 604a is secured to the cable connector 308 on the optical transceiver device 300. In response to the force on the force sensor element 316 reaching a threshold, the force sensor element 316 may generate a signal that is detected by the controller 304.

In response to detecting the signal from the force sensor element 316, the controller 304 may then activate the laser subsystem 306 by allowing power received via the coupling 305 (e.g., from a power source in the computing device 600 and via the connection of the computing device connector on the optical transceiver device 300 to the port 602 on the computing device 600) to be provided to the laser subsystem 306. In response to receiving power via the controller 304, the laser subsystem 306 may operate to emit a laser that is directed via the coupling 314 and the optical data signal transmission element 308g to the transceiver connector 604a, and then through fiber optical cabling in the cable 604. As such, in response to the connection of the cable 604 to the optical transceiver device 300, one of skill in the art in possession of the present disclosure will appreciate how the laser subsystem 306 is activated to emit a laser that may then be utilized to transmit optical signals through the cable 604.

Figure 7B:
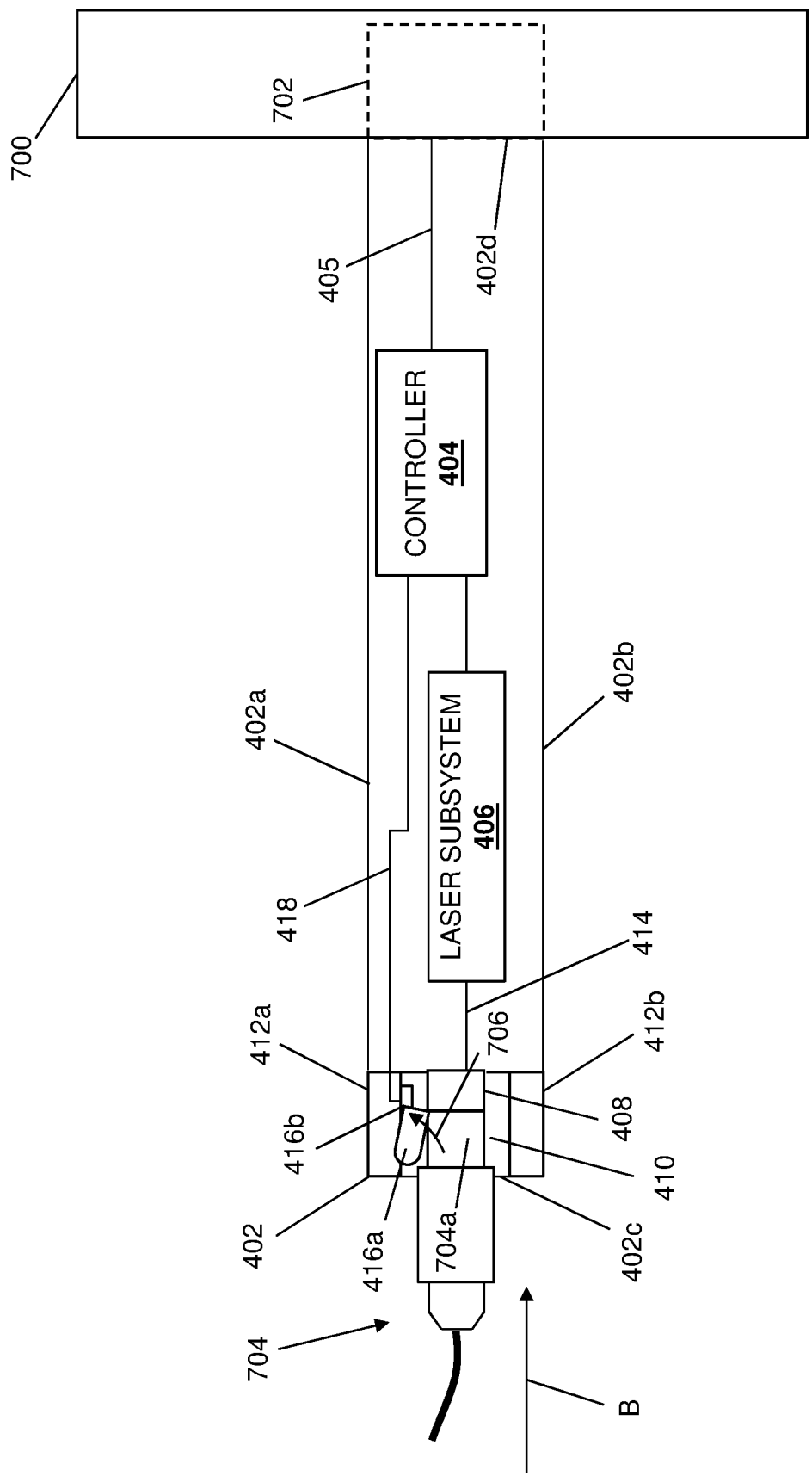
FIG. 7B is a schematic view illustrating an embodiment of the optical transceiver device of FIGS. 4A and 4B operating during the method of FIG. 5.

Similarly, with reference to FIG. 7A, a cable 704 including a transceiver connector 704a may be positioned adjacent the optical transceiver device 400 such that the transceiver connector 704a is located adjacent the front surface 402c of the optical transceiver chassis 402 and aligned with the cable connector 408 on the optical transceiver device 400. As illustrated in FIG. 7B, the transceiver connector 704a may then be moved in a direction B such that the transceiver connector 704a engages the cable connector 408.

As will be appreciated by one of skill in the art in possession of the present disclosure, the engagement of the transceiver connector 704a with the cable connector 408 may begin with the movement of the transceiver connector 704a in the direction B and into the cable connector housing 410, which causes the transceiver connector 704a to engage the first switch sensor element 416a. Continued movement of the transceiver connector 704a in the direction B will then cause the transceiver connector 704a to move the first switch sensor element 416a into engagement with the second switch sensor element 416b as the transceiver connector 704a is secured to the cable connector 408 on the optical transceiver device 400, as illustrated by element 706 in FIG. 7B. In response to the engagement of the first switch sensor element 416a with the second switch sensor element 416b, a circuit may be completed to cause a signal to be generated and detected by the controller 404.

In response to detecting the signal generated in response to the engagement of the first switch sensor element 416a and the second switch sensor element 416b, the controller 404 may then activate the laser subsystem 406 by allowing power received via the coupling 405 (e.g., from a power source in the computing device 700 and via the connection of the computing device connector on the optical transceiver device 400 to the port 702 on the computing device 700) to be provided to the laser subsystem 406. In response to receiving power via the controller 404, the laser subsystem 406 may operate to emit a laser that is directed via the coupling 414 and the optical data signal transmission element 408g to the transceiver connector 704a, and then through fiber optical cabling in the cable 704. As such, in response to the connection of the cable 704 to the optical transceiver device 400, one of skill in the art in possession of the present disclosure will appreciate how the laser subsystem 406 is activated to emit a laser that may then be utilized to transmit optical signals through the cable 704.

The method 500 then proceeds to decision block 510 where it is determined whether the cable has been disconnected from the cable connector on the optical transceiver device. In an embodiment, at decision block 510, the controller 304/404 in the optical transceiver device 300/400 may operate to monitor for a signal from the sensor subsystem in the optical transceiver device 300/400 in order to determine whether the cable has been disconnected from the cable connector 308/408 on the optical transceiver device 300/400. For example, with reference to the optical transceiver device 300, the controller 304 may operate to monitor for a signal from the force sensor element 316 in order to determine whether the cable has deactivated the force sensor element 316 while being disconnected to the cable connector 308 in order to generate that signal. Similarly, with reference to the optical transceiver device 400, the controller 404 may operate to monitor for a signal from the second switch sensor element 416b in order to determine whether the cable has caused the first switch sensor element 416a to disengage the second switch sensor element 416b while being disconnected from the cable connector 408 in order to open a circuit and generate that signal.

If, at decision block 510, it is determined that the cable has not been disconnected from the cable connector on the optical transceiver device, the method 500 returns to block 508. As such, the method 500 may loop such that the controller 304/404 in the optical transceiver device 300/400 monitors for a signal from the sensor subsystem in the optical transceiver device 300/400 in order to determine whether the cable has been disconnected from the cable connector 308/408 on the optical transceiver device 300/400. As such, the laser subsystem 306/406 will remain activated as discussed above with reference to block 508 as long as a cable is connected to the cable connector 308/408 on the optical transceiver device 300/400.

If at decision block 510, it is determined that the cable has been disconnected from the cable connector on the optical transceiver device, the method 500 returns to block 504 where the laser subsystem in the optical transceiver device is deactivated. In an embodiment, at decision block 510 the controller 304/404 may detect a signal from the sensor subsystem in the optical transceiver device 300/400 that indicates that the cable has been disconnected from the cable connector 308/408 and, in response, the controller 304/404 may deactivate the laser subsystem 306/406. For example, with reference to FIGS. 6A and 6B, the transceiver connector 604a may be moved opposite the direction A such that the transceiver connector 604a disengages the cable connector 308.

As will be appreciated by one of skill in the art in possession of the present disclosure, the disengagement of the transceiver connector 604a from the cable connector 308 may include the transceiver connector 604a disengaging the force sensor element 316 to remove the force on the force sensor element 316. In response to the removal of the force on the force sensor element 316 and/or the force on the force sensor element 316 falling below a threshold, the force sensor element 316 may generate a signal that is detected by the controller 304. As will be appreciated by one of skill in the art in possession of the present disclosure, the "signal" generated in response to the removal of the force on the force sensor element 316 may be provided by a lack of a signal that was provided prior to the removal of that force on the force sensor element 316. For example, the "activation" signal generated by the force on the force sensor element 316 that causes the laser subsystem 306 to be activated at block 508 may persist as long as that force is applied to the force sensor element 316, and the removal of that force on the force sensor element 316 may result in force sensor element 316 ceasing to generate the "activation" signal, which may be considered a "deactivation" signal. However, while a specific example is provided, one of skill in the art in possession of the present disclosure will appreciate that the signal used to deactivate the laser subsystem 306 may be provided in a variety of manners that will fall within the scope of the present disclosure as well.

In response to detecting the signal from the force sensor element 316, the controller 304 may then deactivate the laser subsystem 306 by preventing power received via the coupling 305 (e.g., from a power source in the computing device 600 and via the connection of the computing device connector on the optical transceiver device 300 to the port 602 on the computing device 600) from being provided to the laser subsystem 306. In response to no longer receiving power via the controller 304, the laser subsystem 306 may cease emitting the laser that was being directed through fiber optical cabling in the cable 604. As such, in response to the disconnection of the cable 604 from the optical transceiver device 300, one of skill in the art in possession of the present disclosure will appreciate how the laser subsystem 306 is deactivated to prevent the emission of a laser from the laser subsystem 306, thus saving power that would otherwise be used to activate the laser subsystem 306, and eliminating the possibility of the laser emitted by the laser subsystem 306 escaping the optical transceiver device 300 and presenting a danger to the eyes of users.

Similarly, with reference to FIGS. 7A and 7B, the transceiver connector 704a may be moved opposite the direction B such that the transceiver connector 704a disengages the cable connector 708. As will be appreciated by one of skill in the art in possession of the present disclosure, the disengagement of the transceiver connector 704a from the cable connector 408 and movement of the transceiver connector 704a opposite the direction B may allow the first switch sensor element 416a to disengage the second switch sensor element 416b. In response to the disengagement of the first switch sensor element 416a and the second switch sensor element 416b, the circuit may be broken to cause a signal to be generated and detected by the controller 404. As will be appreciated by one of skill in the art in possession of the present disclosure, the "signal" generated in response to the disengagement of the first switch sensor element 416a and the second switch sensor element 416b may be provided by a lack of a signal that existed when the first switch sensor element 416a was engaging the second switch sensor element 416b. For example, the "activation" signal generated by the closing of the circuit due to the engagement of the first switch sensor element 416a and the second switch sensor element 416b that causes the laser subsystem 406 to be activated at block 508 may persist as long as that circuit is closed, and the opening of that circuit may result in the "activation" signal no longer being generated, which may be considered a "deactivation" signal. However, while a specific example is provided, one of skill in the art in possession of the present disclosure will appreciate that the signal used to deactivate the laser subsystem 406 may be provided in a variety of manners that will fall within the scope of the present disclosure as well.

In response to detecting the signal generated in response to the disengagement of the first switch sensor element 416a and the second switch sensor element 416b, the controller 404 may then deactivate the laser subsystem 406 by preventing power received via the coupling 405 (e.g., from a power source in the computing device 700 and via the connection of the computing device connector on the optical transceiver device 400 to the port 702 on the computing device 700) from being provided to the laser subsystem 406. In response to no longer receiving power via the controller 404, the laser subsystem 406 may cease emitting the laser that is directed through fiber optical cabling in the cable 704. As such, in response to the disconnection of the cable 704 from the optical transceiver device 400, one of skill in the art in possession of the present disclosure will appreciate how the laser subsystem 406 is deactivated to prevent the emission of a laser from the laser subsystem 406, thus saving power that would otherwise be used to activate the laser subsystem 406, and eliminating the possibility of the laser emitted by the laser subsystem 406 escaping the optical transceiver device 400 and presenting a danger to the eyes of users.

Thus, systems and methods have been described that provide a sensor subsystem on an optical transceiver device that detects when a cable is connected to the cable connector on the optical transceiver device, and a controller in the optical transceiver device may wait for the detection of that cable connection before it activates the laser subsystem in the optical transceiver device, and then deactivate that laser subsystem when the cable is detected as having been disconnected from the cable connector on the optical transceiver device. While force activated sensor subsystems and switch activated sensor subsystems are described in detail above, one of skill in the art in possession of the present disclosure will recognize how optical sensor subsystems, magnetic sensor subsystems, and/or any other sensors subsystems may be utilized similarly as discussed above and according to the teachings of the present disclosure while remaining within its scope. As such, the laser subsystem in the optical transceiver device of the present disclosure remains deactivated until a cable is connected the cable connector on the optical transceiver device, thus saving power that would otherwise be used to activate the laser subsystem by default (i.e., whenever the optical transceiver device is connected to a port on a computing device), and eliminates the possibility of a laser produced by the laser subsystem escaping the optical transceiver device and presenting a danger to the eyes of users.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An optical transceiver system, comprising:
   an optical transceiver chassis including a cable connector;
   a laser subsystem that is included in the optical transceiver chassis;
   a sensor subsystem that is included in the optical transceiver chassis, wherein the sensor subsystem includes at least one of:
      a force sensor element that is included on the cable connector; or
      a first switch sensor element that is located adjacent the cable connector; and
   a controller is that included in the optical transceiver chassis and that is coupled to the laser subsystem and the sensor subsystem, wherein the controller is configured to:
      receive, from the sensor subsystem, a cable connection signal that indicates that a cable has been connected to the cable connector included on the optical transceiver chassis;
      activate, in response to receiving the cable connection signal, the laser subsystem;
      receive, from the sensor subsystem subsequent to activating the laser subsystem, a cable disconnection signal that indicates that the cable has been disconnected from the cable connector included on the optical transceiver chassis, wherein the cable disconnection signal is provided in response to at least one of:
         the force sensor element experiencing a first force that exceeds a force threshold; or
         a disconnection of a transceiver connector on the cable from the cable connector included on the optical transceiver chassis that allows the first switch sensor element to move out of contact with a second switch sensor element included in the sensor subsystem via at least one of:
            a gravitational force on the first switch sensor element; or
            a resilient member that extends between the first switch sensor element and the optical transceiver chassis; and
      deactivate, in response to receiving the cable disconnection signal, the laser subsystem.

2. The system of claim 1, wherein the controller is configured to:
   prevent the activation of the laser subsystem when the optical transceiver chassis is connected to a port.

3. The system of claim 1,
   wherein the force sensor element is configured to:
      engage the transceiver connector on the cable when the transceiver connector on the cable is connected to the cable connector included on the optical transceiver chassis; and
      provide the cable connection signal in response to the engagement with the transceiver connector providing a second force that exceeds a threshold.

4. The system of claim 3, wherein the force sensor element is configured to:
   provide the cable disconnection signal in response to the transceiver connector on the cable being disconnected from the cable connector included on the optical transceiver chassis and removing the second force on the force sensor element.

5. The system of claim 1,
   wherein the first switch sensor element is configured to:
      engage the transceiver connector on the cable when the transceiver connector on the cable is connected to the cable connector included on the optical transceiver chassis; and
      provide the cable connection signal in response to the engagement with the transceiver connector moving the first switch sensor element into contact with the second switch sensor element included in the sensor subsystem.

6. An Information Handling System (IHS), comprising:
   a processing system; and
   a memory system that is coupled to the processing system and that includes instructions that, when executed by the processing system, cause the processing system to provide a controller engine that is configured to:
      receive, from a sensor subsystem included in an optical transceiver device, a cable connection signal that indicates that a cable has been connected to a cable connector included on the optical transceiver device, wherein the sensor subsystem includes at least one of:
         a force sensor element that is included on the cable connector; or
         a first switch sensor element that is located adjacent the cable connector;
      activate, in response to receiving the cable connection signal, a laser subsystem included in the optical transceiver device;
      receive, from the sensor subsystem subsequent to activating the laser subsystem, a cable disconnection signal that indicates that the cable has been disconnected from the cable connector included on the optical transceiver device, wherein the cable disconnection signal is provided in response to at least one of:
         the force sensor element experiencing a first force that satisfies a force threshold; or a disconnection of a transceiver connector on the cable from the cable connector included on the optical transceiver device that allows the first switch sensor element to move out of contact with a second switch sensor element included in the sensor subsystem via at least one of:
a gravitational force on the first switch sensor element; or
a resilient member that extends between the first switch sensor element and the optical transceiver device; and
deactivate, in response to receiving the cable disconnection signal, the laser subsystem.

7. The IHS of claim 6, wherein the controller engine is configured to:
prevent the activation of the laser subsystem when the optical transceiver device is connected to a port.

8. The IHS of claim 6, wherein the force sensor element that is included on the cable connector is configured to engage the transceiver connector on the cable when the transceiver connector on the cable is connected to the cable connector included on the optical transceiver device, and wherein the controller engine is configured to:
receive the cable connection signal in response to the engagement of the force sensor element with the transceiver connector providing a second force that exceeds a threshold.

9. The IHS of claim 8, wherein the controller engine is configured to:
receive the cable disconnection signal in response to the transceiver connector on the cable being disconnected from the cable connector included on the optical transceiver device and removing the second force on the force sensor element.

10. The IHS of claim 6, wherein first switch sensor element that is located adjacent the cable connector is configured to engage the transceiver connector on the cable when the transceiver connector on the cable is connected to the cable connector included on the optical transceiver device, and wherein the controller engine is configured to:
receive the cable connection signal in response to the engagement of the first switch sensor element with the transceiver connector moving the first switch sensor element into contact with the second switch sensor element included in the sensor subsystem.

11. The IHS of claim 6, wherein the cable connector is a fiber optic cable connector.

12. A method for operating an optical transceiver device, comprising:
receiving, by a controller included in an optical transceiver device from a sensor subsystem included in the optical transceiver device, a cable connection signal that indicates that a cable has been connected to a cable connector included on the optical transceiver device, wherein the sensor subsystem includes at least one of:
a force sensor element that is included on the cable connector; or
a first switch sensor element that is located adjacent the cable connector;
activating, by the controller in response to receiving the cable connection signal, a laser subsystem included in the optical transceiver device;
receiving, by the controller from the sensor subsystem subsequent to activating the laser subsystem, a cable disconnection signal that indicates that the cable has been disconnected from the cable connector included on the optical transceiver device, wherein the cable disconnection signal is provided in response to at least one of:
the force sensor element experiencing a first force that satisfies a force threshold; or
a disconnection of a transceiver connector on the cable from the cable connector included on the optical transceiver device that allows the first switch sensor element to move out of contact with a second switch sensor element included in the sensor subsystem via at least one of:
a gravitational force on the first switch sensor element; or
a resilient member that extends between the first switch sensor element and the optical transceiver device; and
deactivating, by the controller in response to receiving the cable disconnection signal, the laser subsystem.

13. The method of claim 12, further comprising:
preventing, by the controller, the activation of the laser subsystem when the optical transceiver device is connected to a port.

14. The method of claim 12, wherein the force sensor element that is included on the cable connector is configured to engage the transceiver connector on the cable when the transceiver connector on the cable is connected to the cable connector included on the optical transceiver device, and wherein the method further comprises:
receiving, by the controller, the cable connection signal in response to the engagement of the force sensor element with the transceiver connector providing a second force that exceeds a threshold.

15. The method of claim 14, further comprising:
receiving, by the controller, the cable disconnection signal in response to the transceiver connector on the cable being disconnected from the cable connector included on the optical transceiver device and removing the second force on the force sensor element.

16. The method of claim 12, wherein the first switch sensor element that is located adjacent the cable connector configured to engage the transceiver connector on the cable when the transceiver connector on the cable is connected to the cable connector included on the optical transceiver device, and wherein the method further comprises:
receiving, by the controller, the cable connection signal in response to the engagement of the first switch sensor element with the transceiver connector moving the first switch sensor element into contact with the second switch sensor element included in the sensor subsystem.

17. The method of claim 12, wherein the cable connector is a fiber optic cable connector.

* * * * *